United States Patent [19]

Cole et al.

[11] Patent Number: 4,604,424

[45] Date of Patent: Aug. 5, 1986

[54] THERMALLY CONDUCTIVE POLYORGANOSILOXANE ELASTOMER COMPOSITION

[75] Inventors: Richard L. Cole, Bay City; Gloria Janik, Midland, both of Mich.

[73] Assignee: Dow Corning Corporation, Midland, Mich.

[21] Appl. No.: 823,851

[22] Filed: Jan. 29, 1986

[51] Int. Cl.$^4$ .............................................. C08L 83/04
[52] U.S. Cl. .................................... 524/862; 524/432; 524/433; 524/783; 528/15; 528/31; 528/32
[58] Field of Search ............... 524/862, 783, 432, 433; 528/15, 31, 32

[56] References Cited

U.S. PATENT DOCUMENTS

| | | | |
|---|---|---|---|
| 2,671,069 | 3/1954 | Savage | 260/37 |
| 3,885,984 | 5/1975 | Wright | 106/287 SB |
| 3,939,123 | 6/1974 | Matthews et al. | 260/775 AM |
| 3,952,696 | 4/1976 | Saupe | 118/60 |
| 4,072,635 | 2/1978 | Jeram | 524/862 |
| 4,104,509 | 8/1978 | VanBokestal et al. | 219/544 |
| 4,139,519 | 2/1979 | Itoh et al. | 528/27 |
| 4,243,542 | 1/1981 | Mine | 260/375 B |
| 4,360,566 | 11/1982 | Shimizu et al. | 428/404 |
| 4,430,406 | 2/1984 | Newkirt et al. | 430/99 |
| 4,431,701 | 2/1984 | Hamada et al. | 428/379 |
| 4,444,944 | 4/1984 | Matsushita | 524/786 |
| 4,562,096 | 12/1985 | Lo et al. | 528/32 |

FOREIGN PATENT DOCUMENTS 32400 11/1972 Japan .
30746 7/1984 Japan .

Primary Examiner—Melvyn I. Marquis
Attorney, Agent, or Firm—Robert Spector

[57] ABSTRACT

Compositions containing at least one liquid polydiorganosiloxane having an average of two ethylenically unsaturated hydrocarbon radicals per molecule, an organohydrogensiloxane curing agent, a platinum catalyst and a thermally conductive filler consisting, at least in part, of zinc and magnesium oxides are curable to yield elastomers. The high abrasion resistance, low durometer hardness and high heat conductivity of the elastomers make them particularly useful as coatings for the fuser rolls of electrostatic copiers.

25 Claims, No Drawings

THERMALLY CONDUCTIVE POLYORGANOSILOXANE ELASTOMER COMPOSITION

BACKGROUND OF THE INVENTION

1. Field of the Invention

This invention relates to thermally conductive polyorganosiloxane elastomers. More particularly, this invention relates to curable polyorganosiloxane compositions containing a unique combination of thermally conductive fillers. Cured elastomers prepared using these compositions are particularly desirable for use as coatings for the fuser rolls used in electrostatic copying machines.

2. Description of the Prior Art

The principles of electrostatic copying are well known. Basically this process involves applying a finely divided, heat fusible toner to a sheet of paper that is electrostatically charged in an image-wise pattern which duplicates the document or other article being copied. The toner particles adhere to the electrically charged areas of the paper and are subsequently fused to form a permanent image by contact with a heated roll conventionally referred to as a fuser roll.

U.S. Pat. No. 3,952,696, which issued to Saupe on Apr. 27, 1976, describes an electrically heated fuser roll coated with an layer of silicone rubber containing electrically conductive particles. No specific fillers are disclosed except by reference to a silicone rubber composition referred to as "R770 VC2".

U.S. Pat. No. 4,360,566, which issued to Shimuzu et al. on Nov. 23, 1982, teaches a silicone rubber composition suitable for use as a fuser roll coating that does not require the presence of silicone oil during the copying process. The rubber is cured by a hydrosilation reaction and contains a filler selected from a lengthy list that includes, but is not limited to silica, quartz, diatomoceous earth, ferric oxide, zinc oxide and alumina.

U.S. Pat. No. 4,444,944, which issued to Matsushita on Apr. 24, 1984, discloses thermally conductive silicone rubber compositions containing alumina of a specified degree of oil absorption and a particle size range of from 2 to 10 microns.

A preference for zinc oxide, based on its high thermal conductivity, as the thickening agent for liquid polymethylalkylsiloxanes intended for use as heat transfer media is disclosed in U.S. Pat. No. 3,885,984, which issued to Wright on May 27, 1984. The alkyl group contains from 4 to 16 carbon atoms.

U.S. Pat. No. 4,243,542, which issued to Mine on Jan. 6, 1981, teaches using up to 33 percent by weight of zinc oxide in electrical insulators that also include a silicone rubber or silicone resin and a compound containing silicon bonded hydrogen atoms.

Thermally conductive silicone rubber compositions containing silica and up to 5 percent by weight of zinc oxide or a zinc salt of a fatty acid are disclosed in U.S. Pat. No. 4,431,701, which issued to Hamada et al. on Feb. 14, 1984, and in Japanese examined application No. 30746/84, published on July 28, 1984.

The optional use of zinc oxide in combination with gamma-alumina and ferric oxide to improve the physical properties of a peroxide cured silicone rubber is taught in U.S. Pat. No. 2,671,069, which issued to Savage on Mar. 2, 1954. The maximum concentration of zinc oxide is 5 weight percent.

Thermally conductive silicone rubber compositions containing from 100 to 800 parts by weight per 100 parts of rubber of at least one oxide selected from beryllia, alumina, hydrated alumina, magnesia and zinc oxide are disclosed in Japanese unexamined application No. 32400/72, published on Nov. 15, 1972. No compositions containing zinc oxide are exemplified.

The use of magnesia as a thermally conductive filler for silicone rubber used in electric heaters is taught in U.S. Pat. No. 4,104,509, which issued to Van Bokestal on Aug. 1, 1978, and in Japanese examined application No. 13891/76, which issued on May 4, 1976.

Finally, fuser roll coatings formed from fluoropolymers, including fluorosilicone elastomers, and the resistance of these polymers to degradation in the presence of hot silicone oil are taught in European Patent Application No. 77991, which was published on May 4, 1983. Silicone oil is often used to remove adhering toner particles and/or documents from the fuser roll.

It should be obvious from the foregoing discussion that a variety of metal oxides have been used as thermally conductive materials in silicone rubbers, which are also referred to as polyorganosiloxane elastomers. The physical and/or chemical properties of some of these oxides make them unsuitable for use as fuser roll coatings. For example, we have found that coating compositions containing alumina, one of the most thermally conductive metal oxides, are eroded relatively rapidly by abrasive materials. These compositions are themselves sufficiently abrasive to damage the underlying surface of the fuser roll and adjacent parts of the electrostatic copier in which the fuser roll is installed.

The hardness exhibited by a polyorganosiloxane elastomer is determined in part by the type and concentration of oxide filler. Relatively low hardness values are desirable to avoid premature eroding of the elastomer and surfaces that come into contact with the elastomer.

An objective of this invention is to provide one- and two part filled polyorganosiloxane compositions that cure by a hydrosilation reaction. The properties of the resultant thermally conductive elastomers make them desirable for use as coatings on the fuser rolls of electrostatic copiers.

Summary of the Invention

Compositions containing a polydiorganosiloxane with at least two ethylenically unsaturated hydrocarbon radicals per molecule, an organosiloxane curing agent, a platinum-containing hydrosilation catalyst, zinc oxide and magnesium oxide cure to yield elastomers that are thermally conductive and abrasion resistant in addition to exhibiting a durometer hardness that is sufficiently low to maximize the useful life of fuser roll coatings fabricated from the elastomer.

DETAILED DESCRIPTION OF THE INVENTION

One embodiment of this invention provides a one-part polyorganosiloxane composition curable to a thermally conductive silicone elastomer, said composition comprising:

A. 100 parts by weight of a liquid polydiorganosiloxane containing an average of two ethylenically unsaturated hydrocarbon radicals per molecule;

B. a curing agent in an amount sufficient to cure said polydiorganosiloxane, where said curing agent is an organosilicon compound containing an average of at least three silicon bonded hydrogen atoms per molecule and no more than one of said hydrogen atoms per silicon atom;

C. a platinum-containing hydrosilation catalyst in an amount sufficient to promote curing of said polydiorganosiloxane;

D. from 200 to 400 parts by weight of a finely divided thermally conductive filler comprising from 50 to 90 percent by weight of zinc oxide and from 10 to 50 percent by weight of magnesium oxide; and E. an amount of filler treating agent sufficient to maintain the processability of said composition.

In accordance with this embodiment of the present invention, the ingredients of the one-part composition react to form a thermally conductive elastomer. A catalyst inhibitor can optionally be included to extend the working or "pot" life of the composition at ambient temperature or convert it to one that cures only at temperatures above about 70° C.

A second embodiment of this invention provides a two-part polyorganosiloxane composition which when combined is curable to a thermally conductive silicone elastomer, where the first part of said composition comprises A. 100 parts by weight of a liquid polydiorganosiloxane containing an average of two ethylenically unsaturated hydrocarbon radicals per molecule;

B. a platinum-containing hydrosilation catalyst in an amount sufficient to promote curing of said polydiorganosiloxane;

C. from 200 to 400 parts by weight of a finely divided thermally conductive filler comprising from 50 to 90 percent by weight of zinc oxide and from 10 to 50 percent by weight of magnesium oxide; and D. an amount of filler treating agent sufficient to maintain the processability of said first part, and the second part of said composition comprises E. 100 parts of said polydiorganosiloxane;

F. a curing agent in an amount sufficient to cure said polydiorganosiloxane to an elastomer, where said curing agent is an organosilicon compound containing an average of at least three silicon bonded hydrogen atoms per molecule and no more than one of said hydrogen atoms per silicon atom;

G. from 200 to 400 parts by weight of finely divided alumina; and

H. an amount of filler treating agent sufficient to maintain the processability of said second part.

Each of the two parts, referred to hereinafter as I and II, can be stored for days or even months without any adverse affect. Part I contains the polydiorganosiloxane, a thermally conductive filler consisting, at least in part, of zinc and magnesium oxides, a filler treating agent, a platinum hydrosilation catalyst and, optionally, a platinum catalyst inhibitor. Suitable inhibitors are discussed in a subsequent section of this specification.

Part II contains the polydiorganosiloxane, a curing agent and the aforementioned filler treating agent in addition to a thermally conductive filler consisting, at least in part, of alumina. Part II does not contain zinc oxide or magnesium oxide.

The ingredients of the present one- and two-part compositions will now be described in detail.

1. The Polydiorganosiloxane

At least one liquid polydiorganosiloxane containing an average of two ethylenically unsaturated hydrocarbon radicals per molecule is present in the curable compositions of this invention. Polydiorganosiloxanes of this type are sufficiently described in the prior art that a more complete discussion of their preparation and properties is not required in this specification.

A preferred class of polydiorganosiloxanes includes those represented by the general formula

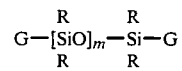

where R represents a monovalent hydrocarbon radical, G represents vinyl or allyl, and m represents a degree of polymerization equivalent to a viscosity of from 0.4 to about 40 Pa.s at 25° C.

If the cured elastomer will be used as a coating on the fuser roll of an electrostatic copier that employs silicone oil as a release agent, the polydiorganosiloxane preferably contains fluorinated hydrocarbon radicals because of the superior resistance of fluorosilicones to degradation by silicone oil relative to polydimethylsiloxanes. These polydiorganosiloxanes can be represented by the general formula

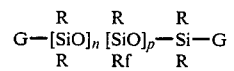

where R and G are as defined hereinabove, Rf represents a fluorinated hydrocarbon radical, the sum of n and p represents a molecular weight equivalent to a viscosity of from 0.4 to 40 Pa.s at 25° C. and the value of n can be from 0 to four times the value of p. For maximum cost effectiveness, the value of n should be the highest that will retain the desired resistance to silicone oil.

The radicals represented by R and Rf can contain from 1 to about 20 carbon atoms. A range of from 1 to 10 carbon atoms is preferred based on the availability of the corresponding monomers. Most preferably R is methyl, phenyl or a combination of methyl and phenyl, Rf is 3,3,3-trifluoropropyl and G is vinyl.

The polydiorganosiloxane ingredient can be a single species. Alternatively this ingredient can be a mixture containing two or more polydiorganosiloxanes of different molecular weights. We have found that the physical properties of the cured elastomer, particularly resiliency and tear strength, are improved by using a combination of high and low molecular weight polydiorganosiloxanes. In preferred embodiments the low molecular weight species exhibits a viscosity of from about 0.4 to about 3 Pa.s at 25° C. and the high molecular weight species exhibits a viscosity of from 10 to about 40 Pa.s at 25° C.

While not willing to be bound by any theory, the improvement in physical properties observed using preferred polydiorganosiloxane compositions described hereinabove is believed to result from a variation in crosslink density within the cured elastomer. This concept is explained in greater detail hereinbelow.

2. The Curing Agent

The polydiorganosiloxane is cured by a hydrosilation reaction between the ethylenically unsaturated hydrocarbon radicals of this ingredient and the silicon-bonded hydrogen atoms of the curing agent. In a typical instance, at least one polydiorganosiloxane containing two ethylenically unsaturated hydrocarbon radicals reacts with a relatively low molecular weight, liquid organosilicon compound containing an average of at least three silicon-bonded hydrogen atoms per molecule.

The curing agent is preferably an organohydrogensiloxane containing an average of at least three silicon-bonded hydrogen atoms per molecule. It can contain from as few as four silicon atoms per molecule up to an average of 20 or more, and exhibits a viscosity of up to 10 Pa.s or higher at 25° C. The curing agent contains repeating units of the formulae $HSiO_{1.5}$, $R'HSiO$ and/or $R'_2HSiO_{0.5}$. The molecules of this ingredient may also include one or more monoorganosiloxane, diorganosiloxane, triorganosiloxy and $SiO_2$ units that do not contain silicon-bonded hydrogen atoms. In these formulae $R'$ is a monovalent hydrocarbon radical as defined hereinabove for the R radical of the polydiorganosiloxane. Alternatively, the curing agent can be a cyclic compound containing diorganosiloxane and organohydrogensiloxane units or a compound of the formula $Si(OSiR'_2H)_4$.

Most preferably $R'$ is methyl and the curing agent is a linear trimethylsiloxy terminated polymethylhydrogensiloxane or a dimethylsiloxane/methylhydrogensiloxane copolymer containing an average of from 10 to about 50 repeating units per molecule of which from 3 to 5 are methylhydrogensiloxane units.

The molecular weights of the polydiorganosiloxane composition and the curing agent together with the number and distribution of the silicon-bonded hydrogen atoms and ethylenically unsaturated hydrocarbon radicals within these ingredients will determine the location of crosslinks in the cured elastomer. The concentration of crosslinks per unit area is often referred to as the "crosslink density" and determines certain physical properties of the cured elastomer, particularly hardness, compressibility and resiliency. The particular combinations of polydiorganosiloxane(s) and curing agent(s) yielding the desired combination of physical properties can readily be determined by routine experimentation with a knowledge of this invention.

The molar ratio of silicon-bonded hydrogen atoms to vinyl or other ethylenically unsaturated hydrocarbon radicals present in the curable compositions of this invention is a major factor in determining the properties of the cured elastomer. Because of the difficulty often experienced in achieving a complete reaction between all of the silicon-bonded hydrogen atoms and all of the vinyl or other ethylenically unsaturated hydrocarbon radicals present in the reaction mixture, it is desirable to use a stoichiometric excess of either vinyl radicals or silicon-bonded hydrogen atoms.

We have found that in order to attain the desired level of tensile properties in the cured elastomer, the curable compositions of this invention should contain from 1.5 up to about 8 silicon-bonded hydrogen atoms for each vinyl radical. Preferably the molar ratio of silicon-bonded hydrogen atoms to vinyl radicals is from 3:1 to about 6:1. The optimum ratio for a given polyorganosiloxane composition of this invention will be determined at least in part by the average molecular weight of the polydiorganosiloxane composition and the type of curing agent.

3. The Platinum Containing Catalyst and Optional Inhibitor

Hydrosilation reactions are typically conducted in the presence of a catalyst that is a platinum group metal or a compound of such a metal.

Useful platinum catalysts include platinum deposited on various carriers such as silica gel or charcoal, salts of platinum, platinic acid, hexachloroplatinic acid, and compounds of platinum such as those described in U.S. Pat. Nos. 3,814,730, 3,923,705, 4,288,345, and 4,421,903, all of which are hereby incorporated by reference to show suitable platinum catalysts and their methods of manufacture.

Platinum compounds such as hexachloroplatinic acid, and particularly complexes of these compounds with relatively low molecular weight vinyl-containing organosiloxane compounds, are preferred catalysts because of their high activity and compatability with the organosiloxane reactants. These complexes are described in U.S. Pat. No. 3,419,593 that issued to David N. Willing on Dec. 31, 1968, and is incorporated herein by reference. Complexes wherein the silicon-bonded hydrocarbon radicals are vinyl and either methyl or 3,3,3-trifluoropropyl are particularly preferred because of their ability to catalyze a rapid curing of the elastomer at temperatures of at least about 70° C.

The platinum-containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate and are therefore economically unattractive, particularly when the preferred catalysts are used.

Mixtures containing all of the foregoing reactants may begin to cure at ambient temperature. To obtain a longer working time or "pot life" once all of the ingredients have been blended, the activity of the catalyst can be retarded or suppressed under ambient conditions by the addition of an inhibitor.

One class of inhibitors includes the acetylenic compounds disclosed in U.S. Pat. No. 3,445,420, which issued on May 20, 1969 to Kookootsedes et al. and is incorporated herein by reference. Acetylenic alcohols such as 2-methyl-3-butyn-2-ol constitute a preferred class of inhibitors that will suppress the activity of the catalyst at 25° C. Compositions containing these catalysts typically require heating at temperatures of 70° C. or above to cure at a practical rate.

An increase in the pot life of a curable composition can also be achieved using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart a satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

The two part compositions of this invention typically contain the hydrosilation catalyst in part I and the curing agent in part II. The reason for this will be explained in the following section pertaining to the thermally conductive fillers. If a catalyst inhibitor is used, it can be in either part.

4. The Filler

The feature that distinguishes the curable compositions of this invention from those of the prior art is the combination of zinc and magnesium oxides as the thermally conductive filler in one-part compositions and in part I of two-part compositions. We have found this combination of fillers to be unique by virtue of the desirable combination of properties imparted to the cured elastomer. Specifically, filler compositions containing the combinations of zinc oxide and magnesium oxides defined in this specification yield cured elastomers that are more resistant to erosion by abrasive materials than compositions containing alumina as the only thermally conductive oxide, yet exhibit relatively low durometer hardness values of from 40 to 60 on the Shore A scale.

In addition to zinc and magnesium oxides the filler portion of one part compositions can include up to 40 percent by weight of other thermally conductive materials, including alumina, ferric oxide and carbon black.

Part II of the present two part compositions should not contain zinc oxide or magnesium oxide if it is to be stored for any appreciable time. We have found that mixtures containing an organohydrogensiloxane curing agent and either zinc oxide or magnesium oxide react during storage at ambient temperature to form a partially cured material. The curing is accompanied by an increase in viscosity and the generation of hydrogen gas as a byproduct. In addition to a higher viscosity, bubble and void formation and the hazard presented by generation of potentially explosive hydrogen, the premature reaction of the curing agent is undesirable because it decreases the amount of curing agent available for reaction with the total polydiorganosiloxane ingredient when the two parts of the composition are combined. The amount of unreacted curing agent may be insufficient to provide a completely cured elastomer. Because the amount of unreacted curing agent present in a given mixture with zinc oxide and/or magnesium oxide will depend upon the time the curing agent and polydiorganosiloxane composition have been in contact, the degree of curing exhibited by the final elastomer may vary from one batch of material to another. This variation usually affects the physical properties of the cured elastomer and makes it difficult to achieve a reproducible product.

One method for avoiding the aforementioned problem of premature curing would be to employ a part II that includes only the curing agent alone or the combination of curing agent and a relatively small amount of the polydiorganosiloxane ingredient. The difficulty with this approach is that the volume of curing agent is usually quite small, often less than 10 percent of the volume occupied by the combination of polydiorganosiloxane(s) and filler. This large difference in the relative volumes of parts I and II would make it difficult to achieve the precise control of polydiorganosiloxane and curing agent concentrations required to achieve reproducibility with respect to the degree of curing and physical properties of the final elastomer.

If one were to increase the volume of part II relative to part I by including in part II more than about a third of the total volume of the polydiorganosiloxane(s) and all of the curing agent without the addition of any thermally conductive filler, the maximum amount of filler that can be incorporated into part I without rendering it unprocessable as a liquid composition is almost always insufficient to impart the desired level of thermal conductivity to the cured elastomer.

We have found that part II can be made storage stable by including alumina as the thermally conductive filler together with the curing agent, a portion of the polydiorganosiloxane(s) and a filler treating agent. To facilitate metering and blending the concentrations of polydiorganosiloxane(s) and fillers in parts I and II are such that these two parts exhibit substantially equal specific gravities.

The concentration of alumina in part II is from 40 to about 80 percent by weight. Optionally, up to about 60 percent of the alumina can be replaced with ferric oxide to impart color in addition to decreasing the abrasiveness of the cured elastomer. While it would be preferable to replace all of the alumina with the amount of ferric oxide required to achieve the same level of thermal conductivity in the cured elastomer, we have found this to be impractical because the viscosity of the resultant composition is so high as to render it unprocessable in conventional mixing and injection molding equipment.

All of the fillers in the present compositions should be in finely divided form to minimize the abrasiveness of these materials. Preferably the particle size of the fillers is such that substantially all of the material will pass through a 325 mesh screen. This is equivalent to a maximum particle size of 44 microns. Most preferably the average particle size of the filler is below 10 microns.

5. The Filler Treating Agent

We have found that mixtures containing at least one polydiorganosiloxane and more than about 50 percent by weight of the thermally conductive fillers of this invention require the presence of a filler treating agent to maintain processability as a liquid composition. In the absence of such a treating agent the consistency of the compositions is typically too stiff for processing using conventional mixing, injection molding and coating equipment.

Suitable filler treating agents include silanes and siloxanes containing an average of at least two functional groups per molecule. While not wishing to be bound by any theory, it is believed that these treating agents are capable of reacting with the hydroxyl groups present on the filler particles. These reactive groups are typically silicon-bonded hydroxyl and alkoxy groups. Organosilicon compounds such as hexaorganodisilazanes and cyclic diorganosiloxane oligomers that are readily hydrolyzed to yield silicon-bonded hydroxyl groups are also useful filler treating agents. These treating agents may contain fluorinated hydrocarbon radicals as required to achieve compatability with the polydiorganosiloxane ingredient.

Representative treating agents are liquids at ambient temperature and include the alkyl orthosilicates, hydroxyl terminated polydiorganosiloxanes containing an average of from four to about ten repeating units per molecule and silanes of the general formula $R''_q Si(OR''')_{4-q}$. In this formula $R''$ and $R'''$ represent identical or different hydrocarbon radicals containing from 1 to about 20 carbon atoms and q is 1 or 2. Preferably $R''$ and $R'''$ are lower alkyl, most preferably methyl, and q is 1. To facilitate processing of the curable compositions of this invention the filler treating agent is preferably compatible with the polydiorganosiloxane ingredient. An incompatible treating agent may not be able to achieve complete "wetting out" of the filler particles, resulting in a considerably higher viscosity for the curable composition.

Typically less than about 5 percent, based on the weight of the curable composition, of the preferred filler treating agents will be sufficient to maintain the processability of the one- and two-part compositions of this invention. Preferably this value is from 0.1 to about 1 percent. If the composition is in two parts, it is usually desirable that both parts contain the filler treating agent.

5. Preparation and Properties of the Curable Compositions

The curable compositions of this invention can be prepared by blending together all of the ingredients at room temperature. Small quantities of ingredients can be blended using manual mixing. Achieving a homogenous blending of large quantities of ingredients to prepare the present one- and two-part compositions typically requires using motor driven equipment such as a propeller type mixer. Because the viscosities of some curable compositions may be quite high due to the relatively large amounts of thermally conductive fillers, use of a dough type mixer of the type manufactured by Baker Perkins may be desirable to ensure a homogeneous composition.

Part I of the present two-part compositions includes at least one polydiorganosiloxane, the platinum-containing hydrosilation catalyst, a filler treating agent and an optional catalyst inhibitor in addition to a filler that includes zinc and magnesium oxides in the relative amounts specified hereinbefore.

Part II contains at least one polydiorganosiloxane and the curing agent in addition to alumina and, optionally, ferric oxide as the thermally conductive fillers. This part may also contain the optional catalyst inhibitor.

Parts I and II each typically exhibit viscosities of up to 1000 Pa.s at 25° C. To facilitate blending and transfer of the compositions and minimize entrapment of air during mixing a viscosity of from 200 to 500 Pa.s at 25° C. is preferred.

Irrespective of the method by which the present compositions are prepared, they are cured by allowing the polydiorganosiloxane(s) and curing agent to react in the presence of the hydrosilation catalyst at ambient or elevated temperature. Compositions containing catalyst inhibitors typically require heating to temperatures of 70° C. or above to achieve a fully cured state within a reasonable time interval, usually from several minutes to an hour.

The relative amounts of polydiorganosiloxane(s) and filler in each part of the two-part compositions of this invention can be varied to achieve the desired volume ratio in which the two parts must be blended to prepare a curable composition.

For convenience in formulating a curable material, the two-part compositions of this invention preferably require blending in a volume or weight ratio of about 1:1.

The cured, thermally conductive polyorganosiloxane elastomers prepared using the present compositions typically exhibit a hardness of from 50 to about 60, measured on the Shore A durometer scale in accordance with test method No. D 2240 of the American Society of Testing and Materials (ASTM) a tensile strength of at least 2500 kPa., and a die C tear strength of at least 2.6 kilonewtons per meter, measured using ASTM test method No. D 624.

When compared with prior art alumina filled elastomers, the elastomers of this invention are considerably more resistant to abrasion, as determined by the rate at which the elastomer erodes when placed in contact with a rotating abrasive wheel in accordance with ASTM test method No. D 4060-81. This test employs a Taber Abrader equipped with a H-18 grade abrasive wheel. The ASTM test procedure was modified by using a thermally conductive elastomer of this invention or the prior art in place of a resin as the test sample and omitting the backing for the test sample. The sample was rotated for 1000 revolutions while in contact with the rotating abrasive wheel. The loading on the abrasive wheel was 500 grams, the counterweight was 125 grams and the thickness of the test sample was 1.9 mm.

The unique combination of properties exhibited by the elastomers of this invention are considered by those skilled in the art to be indicative of superior performance relative to prior art materials when the elastomers are employed as fuser roll coatings in electrostatic copiers.

The following examples describe preferred embodiments of the present compositions and should not be interpreted as limiting the scope of the accompanying claims. All parts and percentages are by weight unless otherwise specified.

EXAMPLE 1

A two-part curable polyorganosiloxane composition of this invention was prepared using the following ingredients:

| Part I | |
| --- | --- |
| Ingredient | Weight Percent |
| Polydiorganosiloxane A | 21.86 |
| Polydiorganosiloxane B | 9.04 |
| Zinc oxide | 49.0 |
| Magnesium oxide | 19.26 |
| Methyltrimethoxysilane | 0.5 |
| Platinum-containing catalyst | 0.24 |
| 2-methyl-3-butyn-2-ol | 0.1 |

Part I contains 100 parts by weight of the mixture of polydiorganosiloxanes A and B and 173.96 parts of total filler, of which 72 percent by weight is zinc oxide. The average particle size of the zinc and magnesium oxides were 0.11 and 6 microns, respectively.

| Part II | |
| --- | --- |
| Ingredient | Weight Percent |
| Polydiorganosiloxane A | 23.25 |
| Tabular alumina | 38.77 |
| Ferric oxide | 35.24 |
| Methyltrimethoxysilane | 0.50 |
| Curing agent | 2.27 |

Part II contains 100 parts by weight of the polydiorganosiloxane and 318.2 parts by weight of total filler, of which 52 percent by weight is alumina and the remainder ferric oxide. The average particle sizes of the alumina and ferric oxide were 10 microns and 0.25 micron, respectively.

Polydiorganosiloxane A is a dimethylvinylsiloxy endblocked dimethylsiloxane/methyl-3,3,3-trifluoropropylsiloxane copolymer containing 60 mole percent dimethylsiloxane units and 0.1 weight percent of vinyl radicals. The viscosity of the polymer is 20 Pa.s at 25° C.

Polydiorganosiloxane B contains the same types and molar concentrations of repeating units as polydiorganosiloxane A, the same terminal units, and exhibits a viscosity of 0.65 Pa.s at 25° C.

The curing agent is a trimethylsiloxy endblocked diorganosiloxane copolymer having an average of five methylhydrogensiloxane units and three dimethylsiloxane units per molecule and a silicon-bonded hydrogen atom content within the range of from about 0.7 to 0.8 weight percent. The amount of curing agent used provided a theoretical molar ratio of silicon-bonded hydrogen atoms to vinyl radicals of 5.4:1.

The platinum-containing catalyst is a chloroplatinic acid complex of sym-divinyltetramethyldisiloxane diluted with dimethylvinylsiloxy endblocked polydimethylsiloxane to provide 0.7 weight percent of platinum.

Methyltrimethoxysilane is the filler treating agent and 2-methyl-3- butyn-3-ol is the catalyst inhibitor.

Each of the two parts was prepared by blending together all of the ingredients using a dough type mixer. The two parts were subsequently blended together to form a homogeneous composition that was molded to form a 1.5 mm - thick sheet. The sheet was cured for 10 minutes at 170° C. and then post cured for one hour at 160° C. Test samples were cut out from this sheet and evaluated with the following results.

| Tensile Strength (ASTM test method D412) | 3671 KPa |
|---|---|
| Durometer hardness (Shore A scale) | 58 |
| Elongation | 108% |
| Weight loss (Tabor abrasion test, ASTM test method D4060-81)* | 1.78 |
| Tear Strength (Die C, ASTM test method D 624) | 4.2 kN/M |

*The ASTM test method was modified as described in the preceding specification.

EXAMPLE 2

(Control)

This example demonstrates the relatively large weight loss and high durometer hardness exhibited by prior art thermally conductive elastomers containing a mixture of alumina and ferric oxide as the filler.

A thermally conductive elastomer composition was prepared as described in the preceding example 1 using the following types and amounts of ingredients.

| Part I | |
|---|---|
| Ingredient | Weight Percent |
| Polydiorganosiloxane A | 18.8 |
| Polydiorganosiloxane B | 11.2 |
| Tabular alumina | 69.0 |
| Methyltrimethoxysilane | 0.5 |
| Platinum-containing catalyst | 0.5 |

Part I contained 100 parts by weight of a mixture of polydiorganosiloxanes A and B and 230 parts by weight of alumina as the only filler.

| Part II | |
|---|---|
| Ingredient | Weight Percent |
| Polydiorganosiloxane A | 18.6 |
| Polydiorganosiloxane B | 3.8 |
| Tabular alumina | 38.8 |
| Ferric oxide | 35.3 |
| Methyltrimethoxysilane | 0.5 |
| Curing agent | 2.9 |
| 2-methyl-3-butyn-2-ol | 0.2 |

The ingredients identified as polydiorganosiloxane A, polydiorganosiloxane B, platinum-containing catalyst and curing agent were the same ones used in the preceding Example 1.

Part II contained 100 parts by weight of a mixture of polydiorganosiloxanes A and B and 330.5 parts by weight of filler, of which 52 percent by weight was alumina and the remainder ferric oxide. The average particle sizes of the alumina and ferric oxide were 10 microns and 0.25 micron, respectively.

The cured elastomer exhibited the following properties:

| Tensile Strength (ASTM test method No. D 412) | 5230 KPa |
|---|---|
| Durometer hardness (Shore A scale) | 71 |
| Elongation | 86% |
| Weight loss (Tabor abrasion) | 6.7% |
| Tear strength (Die C) | 3.5 kN/M |

The lower weight loss and durometer hardness exhibited by the cured elastomer of this invention (Example 1) relative to a thermally conductive elastomer of the prior art (Example 2) are indicative of superior performance in terms of a longer useful service life when the elastomers are evaluated as the fuser roll coatings in an electrostatic copier.

That which is claimed is:

1. A one-part polyorganosiloxane composition curable to a thermally conductive silicone elastomer, said composition comprising:
   A. 100 parts by weight of a liquid polydiorganosiloxane containing an average of two ethylenically unsaturated hydrocarbon radicals per molecule;
   B. a curing agent in an amount sufficient to cure said polydiorganosiloxane, where said curing agent is an organosilicon compound containing an average of at least three silicon-bonded hydrogen atoms per molecule and no more than one of said hydrogen atoms per silicon atom;
   C. a platinum-containing hydrosilation catalyst in an amount sufficient to promote curing of said polydiorganosiloxane;
   D. from 200 to 400 parts by weight of a finely divided thermally conductive filler comprising from 50 to 90 percent by weight of zinc oxide and from 10 to 50 percent by weight of magnesium oxide; and
   E. an amount of filler treating agent sufficient to maintain the processability of said composition.

2. A composition according to claim 1 where said polydiorganosiloxane corresponds to the general formula

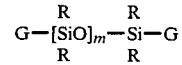

where R represents a monovalent hydrocarbon radical, G represents vinyl or allyl, and m represents a degree of polymerization equivalent to a viscosity of from 0.4 to about 40 Pa.s at 25° C.

3. A composition according to claim 2 where said composition contains two of said polydiorganosiloxanes, the first of which exhibits a viscosity of from about 0.4 to about 3 Pa.s at 25° C. and the second of which exhibits a viscosity of from 10 to about 40 Pa.s at 25° C.

4. A composition according to claim 3 where for each of said polydiorganosiloxanes G is vinyl, R is methyl, phenyl, or a mixture of methyl and phenyl, said curing agent is a trimethylsiloxy endblocked dimethylsiloxane/methylhydrogensiloxane copolymer, said hydrosilation catalyst comprises the reaction product of hexachloroplatinic acid and a vinyl-containing organosiloxane and said said filler treating agent comprises a silane or siloxane having at least two silicon bonded hydroxyl groups or silicon-bonded alkoxy groups per molecule.

5. A composition according to claim 1 where said composition contains an amount of a platinum catalyst inhibitor sufficient to suppress the activity of said catalyst at ambient temperature but not at temperatures above 70° C.

6. A composition according to claim 4 where said composition contains an acetylenic alcohol as a platinum catalyst inhibitor in an amount sufficient to suppress the activity of said catalyst at ambient temperature but not at temperatures above 70° C.

7. A composition according to claim 1 where said polydiorganosiloxane corresponds to the general formula

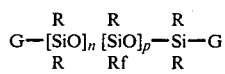

where R represents a monovalent hydrocarbon radical, G represents vinyl or allyl, Rf represents a fluorinated monovalent hydrocarbon radical, the sum of n and p represents a molecular weight equivalent to a viscosity of from 0.4 to 40 Pa.s at 25° C. and the value of n is from 0 to four times the value of p.

8. A composition according to claim 7 where said composition contains two of said polydiorganosiloxanes, the first of which exhibits a viscosity of from about 0.4 to about 3 Pa.s at 25° C. and the second of which exhibits a viscosity of from 10 to about 40 Pa.s at 25° C.

9. A composition according to claim 8 where for each of said polydiorganosiloxanes G represents a vinyl radical, R is methyl, phenyl or a combination of methyl and phenyl, Rf is 3,3,3-trifluoropropyl, said curing agent is a trimethylsiloxy endblocked dimethylsiloxane/methylhydrogensiloxane copolymer, said hydrosilation catalyst comprises the reaction product of hexachloroplatinic acid and a vinyl-containing organosiloxane and said filler treating agent comprises a silane or siloxane having at least two silicon-bonded hydroxyl groups or silicon-bonded alkoxy groups per molecule.

10. A composition according to claim 7 where said composition contains a platinum catalyst inhibitor in an amount sufficient to suppress the activity of said catalyst at ambient temperature but not at temperatures above 70° C.

11. A composition according to claim 9 where said composition contains an acetylenic alcohol as a platinum catalyst inhibitor in an amount sufficient to suppress the activity of said catalyst at ambient temperature but not at temperatures above 70° C.

12. A two-part polyorganosiloxane composition which when combined is curable to a thermally conductive silicone elastomer, where the first part of said composition comprises
  A. 100 parts by weight of a liquid polydiorganosiloxane containing an average of two ethylenically unsaturated hydrocarbon radicals per molecule;
  B. a platinum-containing hydrosilation catalyst in an amount sufficient to promote curing of said polydiorganosiloxane;
  C. from 200 to 400 parts by weight of a finely divided thermally conductive filler comprising from 50 to 90 percent by weight of zinc oxide and from 10 to 50 percent by weight of magnesium oxide; and
  D. an amount of filler treating agent sufficient to maintain the processability of said first part, and the second part of said composition comprises
  E. 100 parts of said polydiorganosiloxane;
  F. a curing agent in an amount sufficient to cure said polydiorganosiloxane, where said curing agent is an organosilicon compound containing an average of at least three silicon bonded hydrogen atoms per molecule and no more than one of said hydrogen atoms per silicon atom;
  G. from 200 to 400 parts by weight of finely divided alumina; and
  H. an amount of filler treating agent sufficient to maintain the processability of said second part.

13. A composition according to claim 12 where up to 60 percent by weight of said alumina is replaced with an equal weight of ferric oxide.

14. A composition according to claim 13 where said polydiorganosiloxane corresponds to the general formula

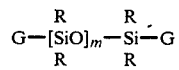

where R represents a monovalent hydrocarbon radical, G represents vinyl or allyl, and m represents a degree of polymerization equivalent to a viscosity of from 0.4 to about 40 Pa.s at 25° C.

15. A composition according to claim 13 where said composition contains two of said polydiorganosiloxanes, the first of which exhibits a viscosity of from about 0.4 to about 3 Pa.s at 25° C. and the second of which exhibits a viscosity of from 10 to about 40 Pa.s at 25° C.

16. A composition according to claim 15 where for each of said polydiorganosiloxanes G is vinyl, R is methyl, phenyl, or a mixture of methyl and phenyl, said curing agent is a trimethylsiloxy endblocked dimethylsiloxane/methylhydrogensiloxane copolymer, said hydrosilation catalyst comprises the reaction product of hexachloroplatinic acid and a vinyl-containing organosiloxane and said said filler treating agent comprises a silane or siloxane having at least two silicon bonded hydroxyl groups or silicon-bonded alkoxy groups per molecule.

17. A composition according to claim 12 where said composition contains an amount of a platinum catalyst inhibitor sufficient to suppress the activity of said catalyst at ambient temperature but not at temperatures above 70° C.

18. A composition according to claim 16 where said composition contains an acetylenic alcohol as a platinum catalyst inhibitor in an amount sufficient to suppress the activity of said catalyst at ambient temperature but not at temperatures above 70° C.

19. A composition according to claim 12 where said polydiorganosiloxane corresponds to the general formula

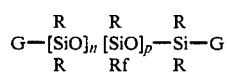

where R represents a monovalent hydrocarbon radical, G represents vinyl or allyl, Rf represents a fluorinated monovalent hydrocarbon radical, the sum of n and p represents a molecular weight equivalent to a viscosity of from 0.4 to 40 Pa.s at 25° C. and the value of n is from 0 to four times the value of p.

20. A composition according to claim 19 where said composition contains two of said polydiorganosiloxanes, the first of which exhibits a viscosity of from about 0.4 to about 3 Pa.s at 25° C. and the second of which exhibits a viscosity of from 10 to about 40 Pa.s at 25° C.

21. A composition according to claim 20 where for each of said polydiorganosiloxanes G represents a vinyl radical, R is methyl, phenyl or a combination of methyl and phenyl, Rf is 3,3,3-trifluoropropyl, said curing agent is a trimethylsiloxy endblocked dimethylsiloxane/methylhydrogensiloxane copolymer, said hydrosilation catalyst comprises the reaction product of hexachloroplatinic acid and a vinyl-containing polyorganosiloxane and said said filler treating agent comprises a silane or siloxane having at least two silicon bonded hydroxyl groups or silicon bonded alkoxy groups per molecule.

22. A composition according to claim 19 where said composition contains a platinum catalyst inhibitor in an amount sufficient to suppress the activity of said catalyst at ambient temperature but not at temperatures above 70° C.

23. A composition according to claim 21 where said composition contains an acetylenic alcohol as a platinum catalyst inhibitor in an amount sufficient to suppress the activity of said catalyst at ambient temperature but not at temperatures above 70° C.

24. A composition according to claim 12 where substantially equal weights of said first and second parts are combined to form said elastomer.

25. A composition according to claim 12 where substantially equal volumes of said first and second parts are combined to form said elastomer.

* * * * *